US007625092B2

(12) United States Patent
Ahn

(10) Patent No.: US 7,625,092 B2
(45) Date of Patent: Dec. 1, 2009

(54) VIDEO DISPLAY APPARATUS AND METHOD FOR DRIVING LAMP IN ADVANCE OF WATCHING

(75) Inventor: Sang-beom Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 541 days.

(21) Appl. No.: 11/475,870

(22) Filed: Jun. 28, 2006

(65) Prior Publication Data

US 2007/0035509 A1 Feb. 15, 2007

(30) Foreign Application Priority Data

Aug. 9, 2005 (KR) ...................... 10-2005-0072864

(51) Int. Cl.

*G03B 21/02* (2006.01)
*G03B 21/00* (2006.01)
*H04N 7/00* (2006.01)
*H04N 5/63* (2006.01)
*G06F 3/048* (2006.01)

(52) U.S. Cl. ......................... 353/85; 353/122; 348/730; 348/844; 715/867

(58) Field of Classification Search ................... 353/85, 353/122; 348/725, 730, 844; 715/867
See application file for complete search history.

(56) References Cited

U.S. PATENT DOCUMENTS 3,940,701 A * 2/1976 Novitski ..................... 455/352
5,528,316 A * 6/1996 Lee ............................ 348/725
RE36,060 E * 1/1999 Miyashita .................... 348/748
6,504,534 B1 * 1/2003 Takase et al. ............... 345/211
2001/0013856 A1 * 8/2001 Hamakada et al. .......... 345/156
2002/0024616 A1 * 2/2002 Kim ........................... 348/714
2002/0157107 A1 * 10/2002 Kitsukawa et al. .......... 725/109
2003/0060990 A1 * 3/2003 Akitaya et al. ................ 702/57
2006/0053315 A1 * 3/2006 Menzl ........................ 713/300

FOREIGN PATENT DOCUMENTS

CN 1469169 A 1/2004
EP 1372022 A2 12/2003
JP 2001-133880 A 5/2001

(Continued)

OTHER PUBLICATIONS (Product Information): Samsung Electronics, "DynaFlat TX-P3071WH Owner's Instructions and User Guide", Online Referenced: http://www.fixya.com/support/p209342-samsung_dynaflat_tx_p3071wh_30_tv/manual-2054.*

(Continued)

*Primary Examiner*—Diane I Lee
*Assistant Examiner*—Jori S Byrne-Diakun
(74) *Attorney, Agent, or Firm*—Sughrue Mion, PLLC

(57) ABSTRACT

A video display method and apparatus including a display panel; a lamp which generates light to display a video image on the display panel; a lamp driving unit which drives the lamp; an information storage unit which stores information about a predetermined start-up time of the lamp; and a controller which controls the lamp driving unit to turn on the lamp when the controller determines that the predetermined start-up time corresponding to the information stored in the information storage unit has come.

26 Claims, 3 Drawing Sheets

FOREIGN PATENT DOCUMENTS

| | | | | |
|---|---|---|---|---|
| KR | 10-2003-0023362 | A | | 3/2003 |
| KR | 10-2004-0051331 | A | | 6/2004 |
| KR | 10-2005-0014047 | A | | 2/2005 |
| KR | 10-2005-0017876 | A | | 2/2005 |
| KR | 2005039983 | A | * | 5/2005 |
| KR | 10-2005-0074805 | A | | 7/2005 |
| WO | WO 2005027508 | A1 | * | 3/2005 |

OTHER PUBLICATIONS (On Sale/in Public Use): Samsung DynaFlat TX-P3071WH 30 inch TV, "Read Reviews", Epinions.com, Online Referenced: http://www.epinions.com/reviews/pr-Samsung__DynaFlat__TX__P3071WH__Standard__Televisions.*

* cited by examiner

VIDEO DISPLAY APPARATUS AND METHOD FOR DRIVING LAMP IN ADVANCE OF WATCHING

CROSS-REFERENCE TO RELATED APPLICATIONS

This application claims priority from Korean Patent Application No. 2005-0072864, filed on Aug. 9, 2005, in the Korean Intellectual Property Office, which is hereby incorporated by reference in its entirety.

BACKGROUND OF INVENTION

1. Field of Invention

Apparatuses and methods consistent with the present invention relate to a video display, and more particularly, to a video display capable of improving a user's convenience by driving a lamp in advance of watching.

2. Description of the Related Art

Conventional video display apparatuses, such as a television (TV), receive a video signal comprising a predetermined image, such as that according to digital TV broadcasting, cable TV broadcasting, etc., from a broadcasting station. Alternatively, conventional video display apparatuses receive a video signal from various video appliances such as a digital camera, a video game device, etc., and process a video image of the received video signal to output the video image.

The video display apparatus can be implemented, for example, by a projection TV using a micro display device such as a liquid crystal display (LCD), a digital light processing (DLP) display, or a liquid crystal on silicon (LCOS) display, etc. The projection TV may comprise a lamp as a light source for emitting a light to display the video image. However, it takes a predetermined time from turning-on time the lamp until light having the predetermined brightness is radiated. Accordingly, when a user turns on a power of the TV to watch the TV, the user cannot watch the TV during a period of time until a temperature of the lamp reaches a sufficient temperature to radiate the light of the predetermined brightness.

SUMMARY OF THE INVENTION

The present invention provides a video display apparatus and a method capable of improving a user's convenience by driving a lamp in advance of watching the video display.

According to an aspect of the present invention, there is provided a video display apparatus comprising: a display panel; a lamp generating light to display a video image on the display panel; a lamp driving part driving the lamp; an information storage part storing information about a predetermined start-up time of the lamp; and a controller controlling the lamp driving part to turn on the lamp when the controller determines that the predetermined start-up time corresponding to the information stored in the information storage part has come.

According to another aspect of the present invention, the start-up time of the lamp is inputted to the controller by a user and the controller stores the start-up time of the lamp in the information storage part.

According to another aspect of the present invention, the controller detects a watching time zone of a user and stores the watching time zone in the information store part and controls the lamp driving part to turn on the lamp at a predetermined earlier time than the stored watching time zone.

According to yet another aspect of the present invention, the video display apparatus further comprises: a display driving part irradiating the light generated by the lamp on the display panel based on a video signal having information about the video image, and wherein the controller controls the display driving part so that the light generated by the lamp during the predetermined time after start-up of the lamp is not irradiated onto the display panel.

According to another aspect of the present invention, the controller controls the display driving part to irradiate the light generated by the lamp onto the display panel when the user requests a watching within the predetermined time.

According to another aspect of the present invention, the controller controls the display driving part to turn-off the lamp when the user does not request the watching.

According to another aspect of the present invention, there is provided a video display method having a display panel and a lamp generating light to display a video image on the display panel, comprising: storing information about a start-up time of the lamp in a predetermined information storage part; determining whether the start-up time of the lamp has come based on information stored in the information storage part; and turning-on the lamp when it is determined that the start-up time of the lamp has come.

According to another aspect of the present invention, the storing comprises inputting the start-up time of the lamp by a user and storing the start-up time of the lamp in the information storage part.

According to another aspect of the present invention, the storing comprises detecting a watching time zone of the user and storing the watching time zone of the user in the information storage part, and the turning-on the lamp is performed within a predetermined time before the stored watching time zone.

According to another aspect of the present invention, the video display method further comprises: irradiating light generated by the lamp based on a video signal having information about the video image onto the display panel; and not irradiating the light generated by the lamp during the predetermined time after start-up of the lamp onto the display panel.

According to another aspect of the present invention, the video display method further comprises: irradiating the light generated by the lamp onto the display panel when the user requests the watching within the predetermined time.

According to another aspect of the present invention, the video display method further comprises turning-off the lamp when the user does not request the watching within the predetermined time.

It is to be understood that both the foregoing general description and the following detailed description are exemplary and explanatory and are intended to provide further explanation of the invention as defined by the following claims.

BRIEF DESCRIPTION OF THE DRAWINGS

The above and other aspects of the present invention will be more apparent and more readily appreciated by describing in detail exemplary embodiments thereof with reference to the accompanying drawings, in which.

DETAILED DESCRIPTION OF EXEMPLARY EMBODIMENTS OF THE PRESENT INVENTION

Figure 1:
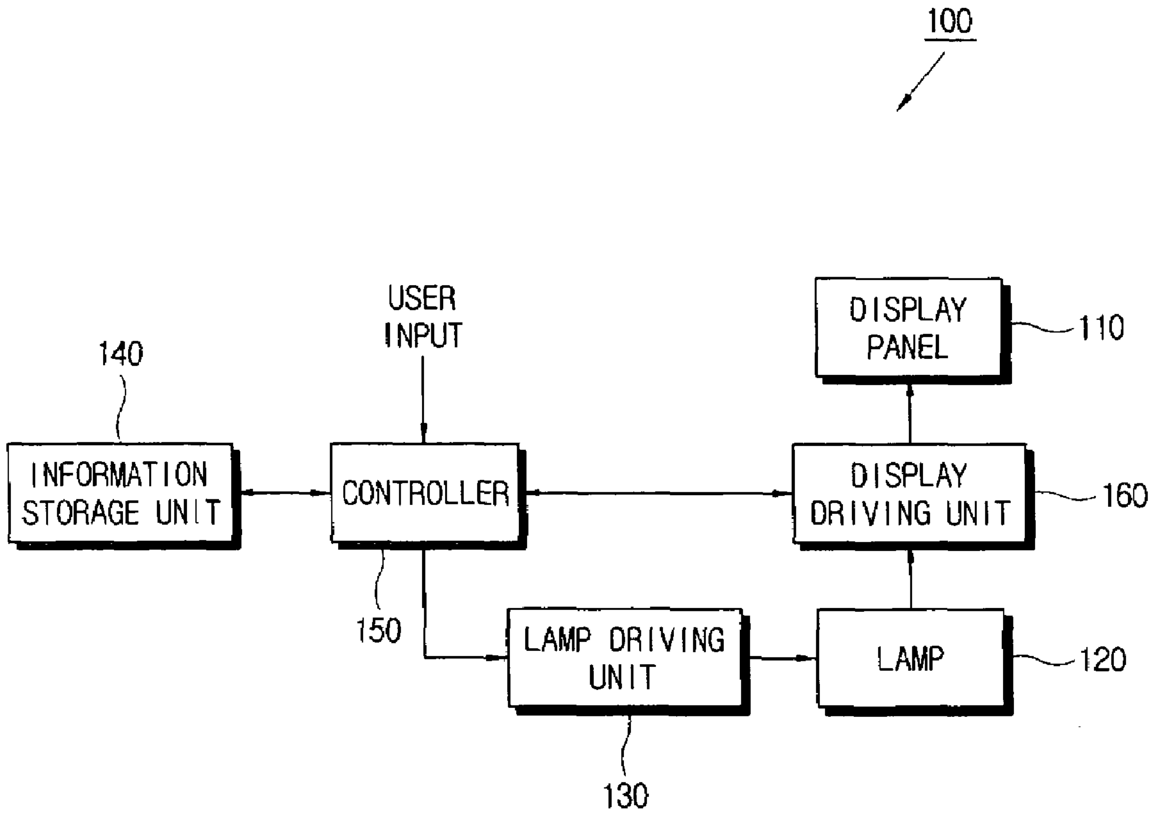
FIG. 1 is a schematic control block diagram of a configuration of a video display apparatus according to an exemplary embodiment of the present invention.

Reference will now be made in detail to the exemplary embodiments of the present invention, examples of which are illustrated in the accompanying drawings, wherein like reference numerals refer to like elements throughout.

FIG. 1 is a schematic control block diagram of a configuration of a video display apparatus 100 according to an exemplary embodiment of the present invention. The video display apparatus 100 receives a video signal comprising a predetermined video image such as that according to digital TV broadcasting, cable TV broadcasting, etc., from a broadcasting station. Thereupon, the video display apparatus 100 processes the received video signal to output the video image. The video display apparatus 100 according to the exemplary embodiment of the present invention may be implemented, for example, by a projection TV using a micro display device such as an LCD, a DLP display, or an LCOS display, etc. The video display apparatus 100 determines whether a predetermined watching time of a user has come or not. When a predetermined watching time of a user has come, the video display apparatus 100 drives the lamp for a predetermined time before the video image is displayed. Accordingly, the inconvenience that the user cannot watch a video image during a preheating time of the lamp which begins after the video display apparatus 100 is turned on by the user is addressed.

As illustrated in FIG. 1, the video display apparatus 100 may comprise a display panel 110, a lamp 120, a lamp driving unit 130, an information storage unit 140, a controller 150, and a display driving unit 160. The display panel 110 serves as a screen displaying the video image and may comprise, for instance, an LCD panel, a DLP panel, etc. The lamp 120 serves as a light source for generating the light to display the video image on the display panel 110 and may comprise, for example, a fluorescent lamp, etc. The lamp driving unit 130 turns on or turns off the lamp 120 to drive the lamp 120 adequately, based on a control of the controller 150. The lamp driving unit 130 may comprise a ballast and may be a circuit providing an adequate start-up time and an operational circumstance to supply power to the lamp 120.

The display driving unit 160 irradiates the light generated by the lamp 120 onto the display panel 110, based on the video signal comprising the video image. The display driving unit 160 may be configured to correspond to a DLP display, an LCD display, a LCOS display, etc., according to a display type of the video image and may comprise a digital micromirror device (DMD). The display driving unit 160 irradiates the light generated by the lamp 120 onto the display panel 110, or does not irradiate the light generated by the lamp 120 onto the display panel 110, according to the control of the controller 150.

The information storage unit 140 stores information about the start-up time of the lamp 120, e.g., information about the frequent watching time(s) of the user. For example, in case that the user watches the TV at 9 a.m., a predetermined time, which is earlier than 9 a.m., may be stored as the information about the start-up time of the lamp 120 in the information storage unit 140. In an exemplary embodiment according to the present invention, a predetermined time, which is earlier than the watching time of the user, and which corresponds to a necessary time required to generate the predetermined brightness of the light, may be set as the start-up time of the lamp 120. The information about the start-up time of the lamp 120 is directly input to the controller 150 by the user and, thus, the controller 150 may store such information in the information storage unit 140. Thereafter, the controller 150 may store information again to renew the start-up time of the lamp 120 corresponding to the user's frequent watching time that is stored in the information storage part 140. The information storage unit 140 may be, for instance, a nonvolatile memory such as a flash memory.

The controller 150 determines whether the start-up time of the lamp 120 has come or not based on the information about the start-up time of the lamp 120 that is stored in the information storage unit 140 in a state that the video display apparatus 100 is turned off. When the controller 150 determines that the start-up time of the lamp 120 has come, the controller 150 controls the lamp driving unit 130 to drive the lamp 120. The controller 150 also controls the display driving unit 160 to mute the display panel 110 for the predetermined time after starting-up the lamp 120 such that the light generated by the lamp 120 for the predetermined time after starting-up the lamp 120 is not radiated onto the display panel 110. If the user requests to watch the video display apparatus 100 during the predetermined time, the controller 150 controls the display driving unit 160 so that the light generated by the lamp 120 is radiated onto the display panel 110. On the other hand, if the user does not request to watch the video display apparatus 100 during the predetermined time, the controller 150 controls the display driving 160 so that the lamp 120 is turned off. The controller 150 may be software which is programmed actively in a general-purpose processor such as a central processing unit (CPU) and may be stored in a predetermined memory.

Figure 2:
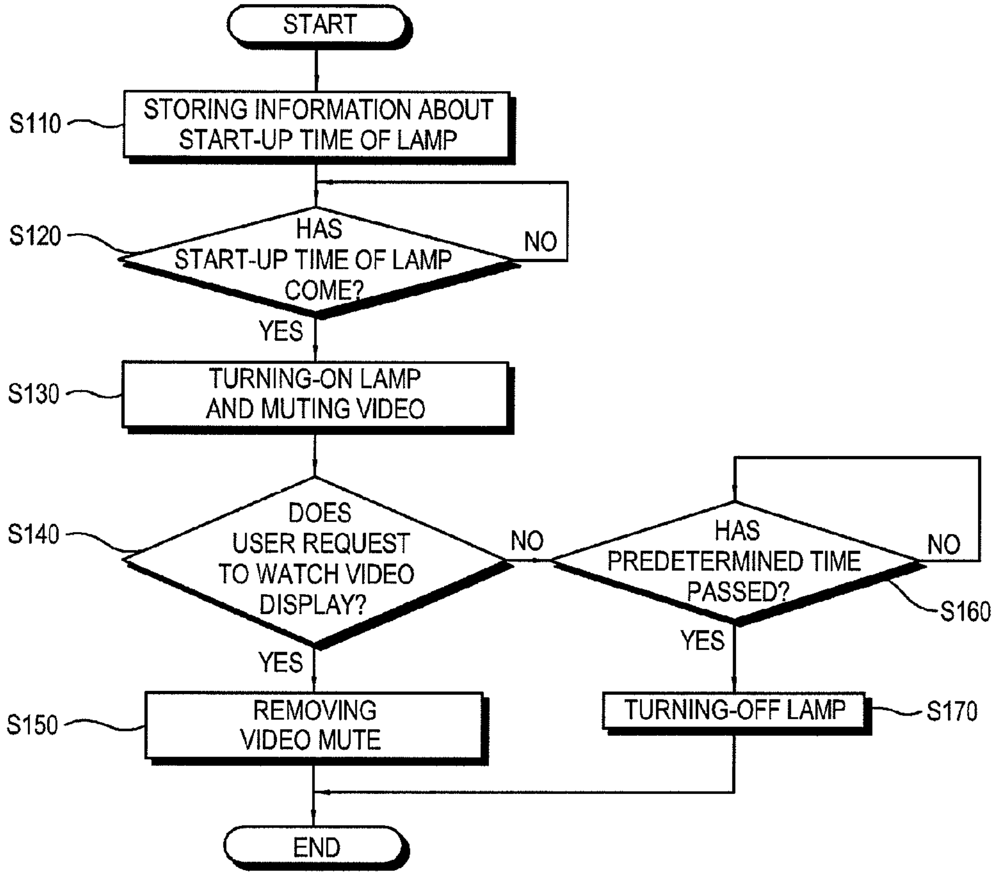
FIG. 2 is a schematic control block diagram of an operation of a video display apparatus according to an exemplary embodiment of the present invention.

FIG. 2 is a schematic control block diagram of an operation of a video display apparatus 100 according to an exemplary embodiment of the present invention. In operation S110, the video display apparatus 100 stores information about a start-up time of the lamp 120. In operation S120, the video display apparatus 100 determines whether the start-up time of the lamp 120 has come or not based on the information about the start-up time of the lamp 120. In operation S130, in the case that the video display apparatus 100 determines that the start-up time of the lamp 120 has come, the lamp 120 is turned on and the video display apparatus 100 is muted.

In operation S140, the video display apparatus 100 determines whether the user requests to watch the video display apparatus 100 within the predetermined time after the lamp 120 is started-up. In operation S150, if the user requests to watch the video display apparatus 100, the video muting is removed. On the other hand, if the video display apparatus 100 determines that the user does not request to watch the video display apparatus 100, in operation S160, the video display apparatus 100 determines whether or not the predetermined time has passed over. In operation S170, if the predetermined time has passed over, the lamp 120 is turned "OFF."

Figure 3:
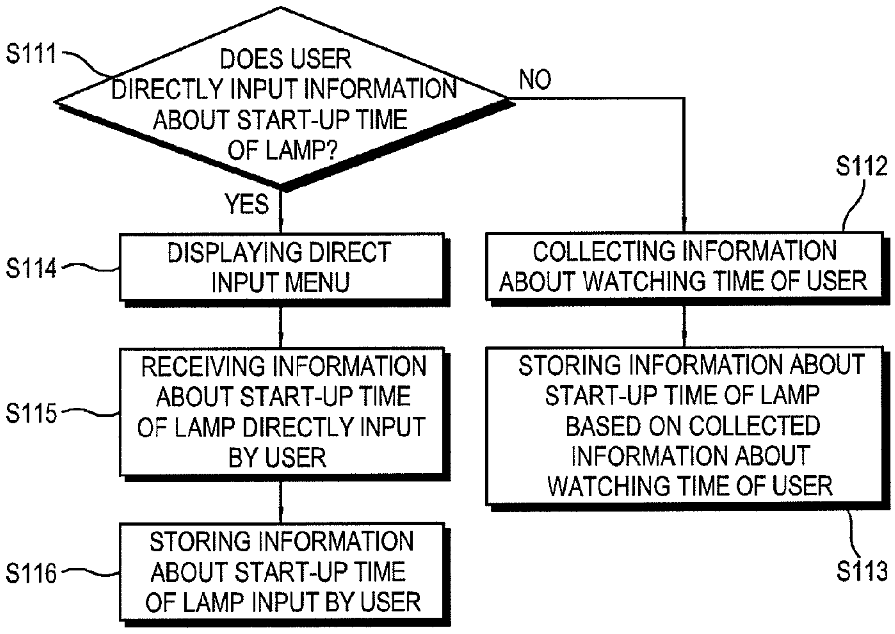
FIG. 3 is a schematic control block diagram of an operation S110 of a video display apparatus according to an exemplary embodiment of the present invention.

FIG. 3 is a detailed schematic control block diagram of the operation S110, according to an exemplary embodiment of the present invention. In operation S111, the video display apparatus 100 determines whether or not a user requests to directly input the information about the start-up time of the lamp 120. If the video display apparatus 100 determines that the user does not request to directly input the information about the start-up time of the lamp 120, the video display apparatus 100 collects information about watching time of the user in operation S112. Then, in operation S113, the video display apparatus 100 stores information about the start-up time of the lamp 120 based on the collected information about the watching time of the user.

If the video display apparatus 100 determines that the user requests to directly input the information about the start-up time of the lamp 120, the video display apparatus 100 displays a direct input menu on the display panel 110 in operation S114. Then, in operation S115, the video display apparatus 100 receives information about the start-up time of the lamp 120 which is directly input by the user. Then, in operation S116, the video display apparatus 100 stores the information about the start-up time of the lamp 120 which was input by the user.

While the present invention has been described above with reference to exemplary embodiments thereof, it will be understood by those of ordinary skill in the art that numerous changes and modifications may be made to the exemplary embodiments of the present invention without departing from the spirit and scope of the embodiments of the present invention as defined in the following claims.

What is claimed is:

1. A video display apparatus comprising:

a display panel;

a lamp which generates light for displaying a video image on the display panel;

a lamp driving unit which drives the lamp;

a display driving unit which irradiates light generated by the lamp onto the display panel based on a video signal comprising information about the video image;

an information storage unit which stores information about a predetermined start-up time of the lamp and a watching time of a user, wherein the predetermined start-up time is set to occur a predetermined time interval before the watching time; and a controller which controls the lamp driving unit to turn on the lamp at the predetermined start up time while controlling the display driving unit to mute display of the video image on the display panel during the predetermined time interval after the predetermined start-up time.

2. The video display apparatus according to claim 1, wherein the predetermined start-up time of the lamp is inputted to the controller by a user, and wherein the controller stores the predetermined start-up time of the lamp in the information storage unit.

3. The video display apparatus according to claim 1, wherein the controller detects the watching time and stores the watching time in the information storage unit.

4. The video display apparatus according to claim 1, wherein the controller controls the display driving unit to mute display of the video image on the display panel by controlling the display driving unit so that light generated by the lamp during the predetermined time interval after the predetermined start-up time is not irradiated on the display panel.

5. The video display apparatus according to claim 1, wherein the controller controls the display driving unit to irradiate light generated by the lamp onto the display panel during the predetermined time interval after the predetermined start-up time, if the user requests to watch the video display apparatus during the predetermined time interval after the predetermined start-up time.

6. The video display apparatus according to claim 1, wherein the controller controls the display driving unit to turn-off the lamp if the user does not request to watch the video display apparatus.

7. The video display apparatus according to claim 1, wherein the controller controls the display driving unit to turn-off the lamp if the user does not request to watch the video display apparatus within the predetermined time after the watching time of the user.

8. The video display apparatus according to claim 1, wherein the controller controls the display driving unit to turn-off the lamp if the user does not request to watch the video display apparatus during predetermined time after the predetermined start-up time.

9. The video display apparatus according to claim 3, wherein the watching time of the user comprises a time when the video display apparatus is frequently watched.

10. A video display method comprising:

storing, in a storage unit, information about a predetermined start-up time of a lamp, which generates light for displaying a video image on a display panel, and a watching time of a user of the video display apparatus, wherein the predetermined start-up time is set to occur a predetermined time interval before the watching time;

determining whether the predetermined start-up time of the lamp has occurred based on the information which is stored;

if it is determined that the predetermined start-up time of the lamp has occurred, turning-on the lamp at the predetermined time while muting display of the video image on the display of the display panel during the predetermined time interval after the predetermined start-up time.

11. The video display method according to claim 10, wherein the storing information about the predetermined start-up time comprises:

inputting the predetermined start-up time of the lamp by a user; and storing the predetermined start-up time.

12. The video display method according to claim 10, wherein the storing information about the predetermined start-up time comprises:

detecting the watching time of the user; and storing the watching time.

13. The video display method according to claim 10, further comprising irradiating light, which is generated by the lamp based on a video signal comprising information about the video image, onto the display panel.

14. The video display method according to claim 13, wherein the muting display of the video image on the display on the display panel comprises preventing light generated by the lamp during a predetermined time interval after the predetermined start-up time from radiating onto the display panel.

15. The video display method according to claim 13, further comprising irradiating light generated by the lamp onto the display panel during the predetermined time interval after the predetermined start-up time if a user requests to watch the video display during the predetermined time interval after the predetermined start-up time.

16. The video display method according to claim 13, further comprising turning-off the lamp if the user does not request to watch the video display within the predetermined time interval after the predetermined start-up time.

17. The video display method according to claim 13, further comprising turning-off the lamp if the user does not request to watch the video display within the predetermined time interval after the watching time.

18. The video display method according to claim 12, wherein the watching time of the user comprises a time when the video display is frequently watched.

19. The video display apparatus according to claim 3, wherein the watching time is a time when the user initializes a start-up of the lamp directly, and the watching time is not directly set in advance and stored in the information storage unit by the user.

20. The video display apparatus according to claim 19, wherein the controller collects frequent user watching time information and determines a time the video display is frequently watched as the watching time of the user, and the controller detecting the watching time automatically.

21. The video display apparatus according to claim 20, wherein the frequent user watching time is a time when the user initializes the start-up of the lamp directly on a frequent basis, and the frequent user watching time is not directly set in advance and stored in the information storage unit by the user.

22. The video display apparatus according to claim 20, wherein the pre-determined start-up time of the lamp is not directly inputted to the controller by the user.

23. The video display apparatus according to claim 3, wherein the pre-determined start-up time of the lamp is not directly inputted to the controller by the user.

24. The video display method according to claim 12, wherein the watching time is a time when the user initializes a start-up of the lamp directly, and the watching time is not directly set in advance and stored in the information storage unit by the user.

25. The video display apparatus according to claim 1, wherein the controller controls the display driving unit to end the mute of the display of the video image on the display panel, if the user requests to watch the video display apparatus within a predetermined time interval after the predetermined start-up time.

26. The video display apparatus according to claim 1, a controller which controls the display driving unit to start to irradiate light generated by the lamp onto the display panel, if a user requests to watch the video display apparatus during a predetermined time interval after the predetermined start-up time.

* * * * *

UNITED STATES PATENT AND TRADEMARK OFFICE

CERTIFICATE OF CORRECTION

PATENT NO. : 7,625,092 B2
APPLICATION NO. : 11/475870
DATED : December 1, 2009
INVENTOR(S) : Sang-beom Ahn It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 697 days.

Signed and Sealed this

Twenty-first Day of December, 2010

David J. Kappos

*Director of the United States Patent and Trademark Office*